(12) United States Patent
Hassidov Pleser et al.

(10) Patent No.: US 12,011,938 B2
(45) Date of Patent: Jun. 18, 2024

(54) PRINTING SYSTEMS

(71) Applicant: Hewlett-Packard Development Company, L.P., Spring, TX (US)

(72) Inventors: Aviv Yehezkel Hassidov Pleser, Sant Cugat del Valles (ES); Borja Navas-Sanchez, Sant Cugat del Valles (ES); Ramón Viedma Ponce, Sant Cugat del Valles (ES); Anna Margareta Hjort, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 209 days.

(21) Appl. No.: 17/258,498

(22) PCT Filed: Feb. 12, 2019

(86) PCT No.: PCT/US2019/017698
§ 371 (c)(1),
(2) Date: Jan. 7, 2021

(87) PCT Pub. No.: WO2020/167299
PCT Pub. Date: Aug. 20, 2020

(65) Prior Publication Data
US 2022/0351011 A1 Nov. 3, 2022

(51) Int. Cl.
*B41J 29/393* (2006.01)
*B41J 3/407* (2006.01)
*G05D 1/00* (2006.01)

(52) U.S. Cl.
CPC ............ *B41J 29/393* (2013.01); *B41J 3/407* (2013.01); *G05D 1/0094* (2013.01); *G05D 1/0212* (2013.01)

(58) Field of Classification Search
CPC ....... B41J 29/393; B41J 3/407; G05D 1/0094; G05D 1/0212; G05D 2201/02; G01C 21/206
(Continued)

(56) References Cited

U.S. PATENT DOCUMENTS 9,110,469 B2   8/2015   Yamamoto et al.
9,800,746 B2   10/2017  Sasaki
(Continued)

FOREIGN PATENT DOCUMENTS

JP    2003291420 A   10/2003
JP    2017097775 A   6/2017
WO    WO-2015111054 A1   7/2015

*Primary Examiner* — Jason S Uhlenhake
*Assistant Examiner* — Alexander D Shenderov
(74) *Attorney, Agent, or Firm* — Jordan IP Law, LLC

(57) ABSTRACT

A self-propelled printer is provided having communication circuitry to receive print data for an image to be formed. A drive mechanism of the printer to provides locomotion of the entire self-propelled printer and a print head is arranged to transfer a print material onto a print medium. Processing circuitry to generates an image formation path to be traversed by the print head via locomotion of the self-propelled printer. The image formation path is based at least in part on the received print data. The processing circuitry controls the drive mechanism to autonomously drive the self-propelled printer along the image formation path. A corresponding method and computer program for generating a 2D image using a self-propelled printer are provided.

13 Claims, 11 Drawing Sheets

(58) Field of Classification Search
USPC .......................................................... 347/19
See application file for complete search history.

(56) References Cited

U.S. PATENT DOCUMENTS

| | | |
|---|---|---|
| 10,052,883 B2 | 8/2018 | Liao et al. |
| 2002/0158955 A1* | 10/2002 | Hess ..................... B41J 11/002 347/108 |
| 2008/0228293 A1* | 9/2008 | Tanaka ................. B41J 13/0027 700/52 |
| 2011/0098858 A1 | 4/2011 | Yourlo et al. |
| 2011/0310433 A1 | 12/2011 | Hagiwara |
| 2016/0311239 A1* | 10/2016 | Elbaum ...................... B41J 3/36 |
| 2017/0039007 A1 | 2/2017 | Nathani et al. |
| 2017/0180596 A1 | 6/2017 | Sasaki |
| 2017/0269878 A1 | 9/2017 | Taniguchi |

\* cited by examiner

PRINTING SYSTEMS

BACKGROUND

Some printers may form text and images on a print medium based on received print data from electronic circuitry inside the printer. The printing may be performed by feeding a print medium such as paper through a carriage mechanism in the printer whilst one or more print heads traverses the print medium by running back and forth across a guide rail inside the printer and selectively firing printing liquid onto the print medium depending on the received print data.

Robotic vehicles can be used to aid efficiency of industrial and domestic processes and some printers may be provided with robotic self-locomotion, which may be used to deliver a completed print-out to a user in a given location in a building using indoor navigation. However, provision of accurate indoor navigation for robotic devices can be challenging because Global Positioning System (GPS) navigation has limited effectiveness in indoor environments.

DETAILED DESCRIPTION

The use of robotic vehicles may be implemented to relieve the number of tasks that may need to be performed manually by users and may provide an increase in the reliability of tasks being performed to a predetermined level of precision. For example, during construction a building layout detailing a plan of a building may be used as a guide. It is often the case that prior to the construction phase of building, a building layout is manually drawn by experienced workers directly on to the floor on top of which the building is to be built using pens, strings, markers and such like. The building layout may direct construction workers as to where elements of the building are to be positioned. Thus, the precision with which the building layout is drawn on to the floor may impact the quality of the finished build and the manual process is both labour intensive and sensitive to human error. In particular, if the layout is inaccurately drawn onto the floor and is used as a guide during construction, the resulting building may not be structurally sound. Furthermore, re-working of erroneous layouts can have a high financial cost.

Although robotic vehicles are known, the precision of movement that is desirable in performing printing on surfaces such as printing a two-dimensional line drawing on a floor inside a building using a robot can be difficult to achieve. Furthermore, there is a prejudice in the art to perform two-dimensional printing by causing a print medium to move through a printer or, in the case of three-dimensional printing, for the build material to be distributed within a three-dimensional print region within a printer body.

By way of contrast, according to the present technique, a printout may be created by self-locomotion of an entire printing device across a print medium such that the locomotion path depends on received print data. Thus a size of the printed image need not be constrained by any internal mechanical dimensions of the printer and more diverse types of print medium may be more readily printed on. A drive mechanism may be carefully controlled by processing circuitry to precisely guide one or more print heads as well as the main body of the printer via a drive mechanism to move according to an image formation path determined from received print data.

Figure 1:
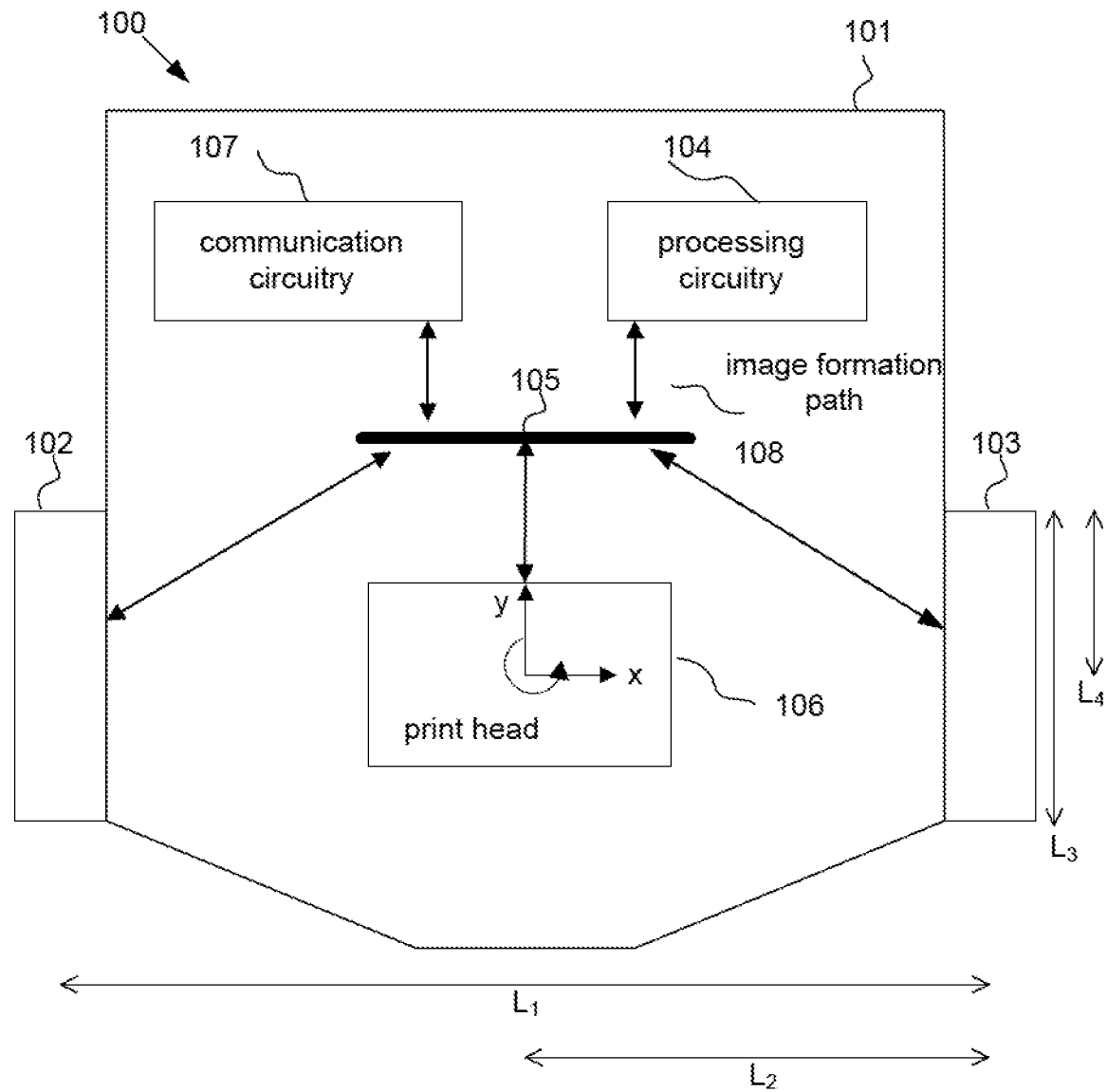
FIG. 1 schematically illustrates an example self-propelled printer.

FIG. 1 shows an example of a self-propelled printer 100 comprising a main body 101 and a drive mechanism 102, 103, which in this example comprises two wheels 102, 103 controlled by a differential drive mechanism (not shown). The drive mechanism 102, 103 may be controlled by a set of processing circuitry 104 of the self-propelled printer 100, via a bus 105 or an alternative internal communication link, to drive locomotion of the printer. The self-propelled printer 100 may be autonomously driven without input by a user to perform the locomotion apart, although provision of print data for an image to be formed may be initiated by the user. The self-propelled printer 100 may be autonomously controlled by the processing circuitry 104. The drive mechanism 102, 103 of the self-propelled printer 100 may comprise at least two wheels that may be driven by an engine. The at least two wheels of the self-propelled printer 100 may be driven independently, for example by a differential drive engine, to facilitate a range of motion of the self-propelled printer including, for example, turning and rotation to form curves and corners as well as straight line motion. The self-propelled printer may further comprise a print head 106 to transfer a print material to a surface. In alternative examples a plurality of print head may be provided and a given print head may have one or more print nozzles. The print material may be a printing fluid, such as a liquid (e.g. ink), a powder or any suitable build material, such as a pre-melted polymer or metal.

In one example, the printer may further comprise plugged-in hardware that may be an imaging apparatus to scan and document the environment around the printer. The imaging apparatus may, for example, be a 3D camera or a stereo camera. In another example, the printer may further comprise a detachable stabilised laser, which may be mounted or otherwise coupled with the printer. The stabilised laser may used to project reference points on to an overhead structure, such as a ceiling or a roof. The projection of the reference points on to the overhead structure may allow installation points to be easily marked.

The print head 106 may be located within the main body 100 of the printer at a lateral centre point between the at least two wheels of the drive mechanism. For example, the at least two wheels of the drive mechanism 103, 104 may be separated by a distance $L_1$. The print head may be centred at a distance $L_2$ from at least one wheel of the drive mechanism 103, where $L_2$ may be one half of $L_1$. The print head 106 may also be longitudinally located at a distance $L_2$ from at least one wheel of the drive mechanism 103 at a point along an axis connecting the centres of the at least two wheels of the driving mechanism 103, 104. For example, the at least one wheel of the drive mechanism 103 may have a diameter of $L_3$ and a radius of $L_4$. The print head 106 may be centred at a position along an axis at a distance of $L_4$ from the outside edge of the at least one wheel of the drive mechanism 103. The positioning of the print head at the centre point between the at least two wheels of the drive mechanism may allow the position of the print head to be accurately controlled by the independent rotation of the at least two wheels and may allow the print head to perform rotation around a fixed point without the use of lateral movement to perform a turn. This provides an efficient way of mechanically controlling the motion of the print head according to an image formation path generated by the processing circuitry 104 depending on the print data.

The self-propelled printer 100 may further comprise a set of communication circuitry 107 to receive print data for the building layout, or any other suitable image to be printed by the self-propelled printer. The communication circuitry 107 may operate using a wireless communication technology such as, Wi-Fi. The self-propelled printer may, for example, print lines, text, a barcode, or any other identifier. The print data may be in a Computer Aided Design (CAD) file format. The print data may comprise vector information including a relative position, which may be from a known point of origin on the print medium and the vector information further including an absolute distance for at least one line-segment of an image to be printed. The print data may be received by the self-propelled printer from a server or a user device such as a smartphone that may generate the print data and establish a connection such as a Wi-Fi connection with the communication circuitry 107.

The processing circuitry 108 of the self-propelled printer 100 may further determine an image formation path 108 to be traversed by the printer 100 based on the received print data. The image formation path may be defined relative to the origin point of the self-propelled printer. The origin point may be on or close to the print medium, such as a point on a floor where a building layout is to be printed.

Figure 2:
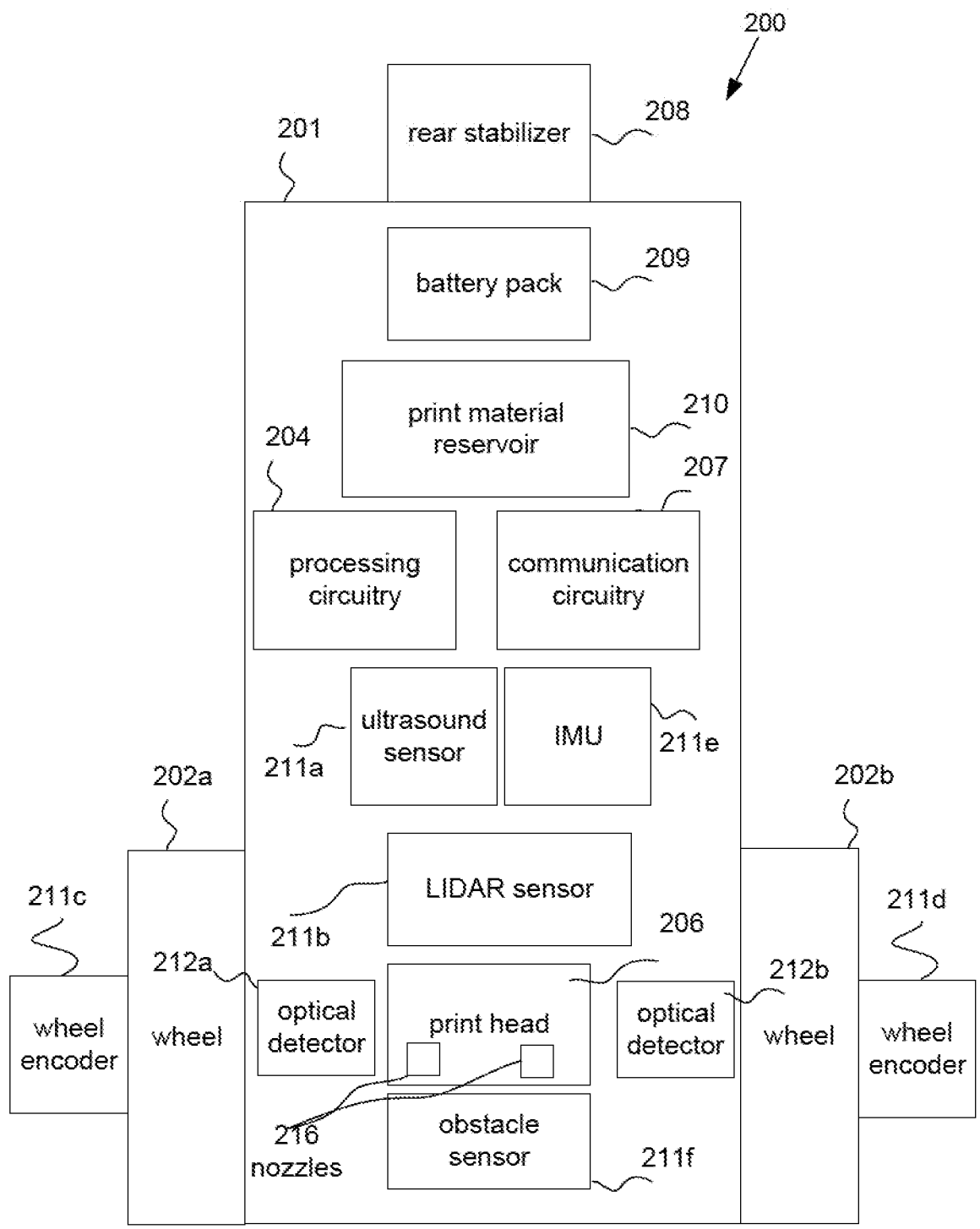
FIG. 2 schematically illustrates an example self-propelled printer within a beacon communication environment.
Figure 2:
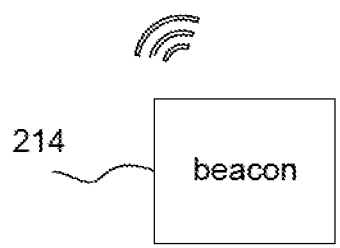

FIG. 2 shows an example of a self-propelled printer 200 further comprising a rear stabilizer 208. The rear stabilizer 208 may comprise a functional element with a single point of contact with the printing medium or surface so as to provide support for a main body 201 of the self-propelled printer 200. For example, the rear stabilizer may comprise a caster wheel.

The self-propelled printer 200 shown in the example of FIG. 2 may further comprise a battery pack 209 to power the self-propelled printer 200. The battery pack 209 may be integrally formed as a lifetime power supply or may be rechargeable or replaceable. For example, the battery pack 209 may be a lithium ion battery. The self-propelled printer 200 may further comprise a print material reservoir 210 to store the print material. The print material reservoir 210 may be a lifetime reservoir or may be refillable or replaceable. For example, the print material reservoir 210 may comprise a tank integrally formed of the main body 201 of the printer 200. The tank may further comprise a lid which may be removed by a user to refill the print material. The print material reservoir 210 may also include heating, preparation or preservation elements to provide the print material to the print head 206 in a printable state.

The self-propelled printer 200 shown in FIG. 2 may further comprise at least one sensor 211a, b, c, d. The at least one sensor may be mounted onto or built into the main body 201 of the printer 200. At least a portion of the sensor may be exposed to the external environment of the printer. The at least one sensor 211 a, b, c, d may provide data to the processing circuitry 204 to control the locomotion of the printer 200. For example, the at least one sensor 211a,b,c,d,e may be configured to detect locomotion of the printer 200.

For example, the printer 200 may comprise at least two wheel encoders 211c,d. These wheel encoders may be configured with respect to at least two wheels 202 a,b of the drive mechanism of the self-propelled printer 200 so as to detect a rotation of the wheels 202a,b. The wheel encoder 202 a,b data may be provided to the processing circuitry 204 of the printer 200 and based on the wheel encoder data, the processing circuitry may be able to model a change in at least one of an orientation or position of the printer 200. The processing circuitry 204 may then determine an estimated relative position of the printer with respect to a previously estimated or last known position of the printer. The wheels 202a, 202b may be "power wheels" and in some examples may have at least one of adjustable camber and adjustable toe angles. Adjustability of the wheels in this way may provide improved agility and improved stability of the self-propelled printer 200. A variety of different adjustment angles may be implemented for the wheels, but according to one example, the adjustment range may be from zero degrees up to five degrees.

The printer 200 may further comprise at least one optical sensor to detect a slippage of the at least one wheel 211 c,d of the drive mechanism relative to the print medium. The optical sensor(s) may comprise at least two optical detectors 212 a,b, which may be located along the axis joining the centre of the wheels 202a,b and may be positioned laterally between the print head and the respective wheels 202a,b, respectively. The optical detectors may be directed towards the print medium. The optical detectors may be configured to detect at least one of a difference in relative motions between the two wheels 202 a,b resulting from the slippage one of one of the wheels on the print medium (such as a floor surface). The optical sensor may detect this difference based on a detected apparent motion between the printer 200 and the at least two respective points on the print medium observed by the optical detectors 212 a,b. In an example, the apparent motions may be detected based on an optical flow analysis and the optical sensor may be an optical flow sensor. The optical sensor may provide a slippage detection to the processing circuitry 204, which may update the estimated relative position of the printer in dependence on the slippage detection. Although optical detectors have been used to detect slippage of a print medium as it is propelled through a printer by a print carriage, according to the present technique it has been recognised that similar optical sensors can be utilised for the different purpose of detecting slippage of a robotic vehicle drive mechanism where it contacts the ground or print medium as the vehicle travels across the given surface. This use of optical sensors to detect wheel slippage of a self-propelled vehicle is not known in the art.

The printer 200 may further comprise a LiDaR (Light Detection and Ranging) sensor 211*b* to detect at least one of a relative distance from and orientation of the printer 200 with respect to at least one object on or proximate to the print medium with a known position. The LiDaR sensor 211*b* may detect at least one of the relative distances and orientation using the reflection of laser light. For example, the LiDaR sensor 211*b* may detect a distance between the printer 200 and a pillar or other remote object of known position on or close to the print medium. As the printer 200 traverses the image formation path, the LiDaR sensor 211*b* may provide the processing circuitry 204 with updated relative distances between the printer 200 and the pillar.

The measurement data acquired using the LiDaR sensor 211*b* may be provided to the processing circuitry 204 to determine at least one of a relative position or orientation of the printer 200.

The LiDaR sensor 211*b* may be further configured to detect an unexpected obstacle within the image formation path of the printer 200. Alternatively, the printer 200 may comprise an additional obstacle sensor 211*f* that may be configured to detect an obstacle within the image formation path of the printer 200 to reduce the likelihood of the object interfering with the printing process.

The printer 200 may further comprise an IMU (Inertial Measurement Unit) 211*e* sensor to detect a locomotion of the printer 200 and track it over a time period. The IMU may comprise an accelerometer to detect a linear acceleration of the printer 200, a gyroscope to detect a rotational acceleration of the printer 200 and may additionally comprise a magnetometer to provide an orientation of the printer 200 relative to magnetic North.

In one example, the wheel encoders 211*c,d*, optical sensor 212 *a, b*, LiDaR 211*b*, IMU 211*e* and an ultrasound sensor 211*a* may be used alone or in any combination or permutation of two or more of the set of sensors.

In one example, in addition to the wheel encoders 211*c,d* or the wheel encoders 211*c,d* and at least one of the sensors 211*b,e,f*, the printer 200 further comprises the ultrasound sensor 211*a* which communicates with at least one beacon 214 that is in communication range with the printer 200. The beacon 214 may be an indoor beacon such as a Wi-Fi access point or may be an ultrasound beacon. The ultrasound sensor 211*a* may provide the processing circuitry with an absolute position estimate of the printer 200 based on an origin point of the printer 200.

The print head 206 of the example printer 200 shown in FIG. 2 may comprise at least one nozzle 216, which may be a directional nozzle. The at least one nozzle may be moveable within the print head 206 or may be fixed with a pre-determined directionality. In one example, the print head 206 may comprise a matrix of a plurality of nozzles, where each nozzle of the plurality of nozzles may be directed to fire independently.

Figure 3:
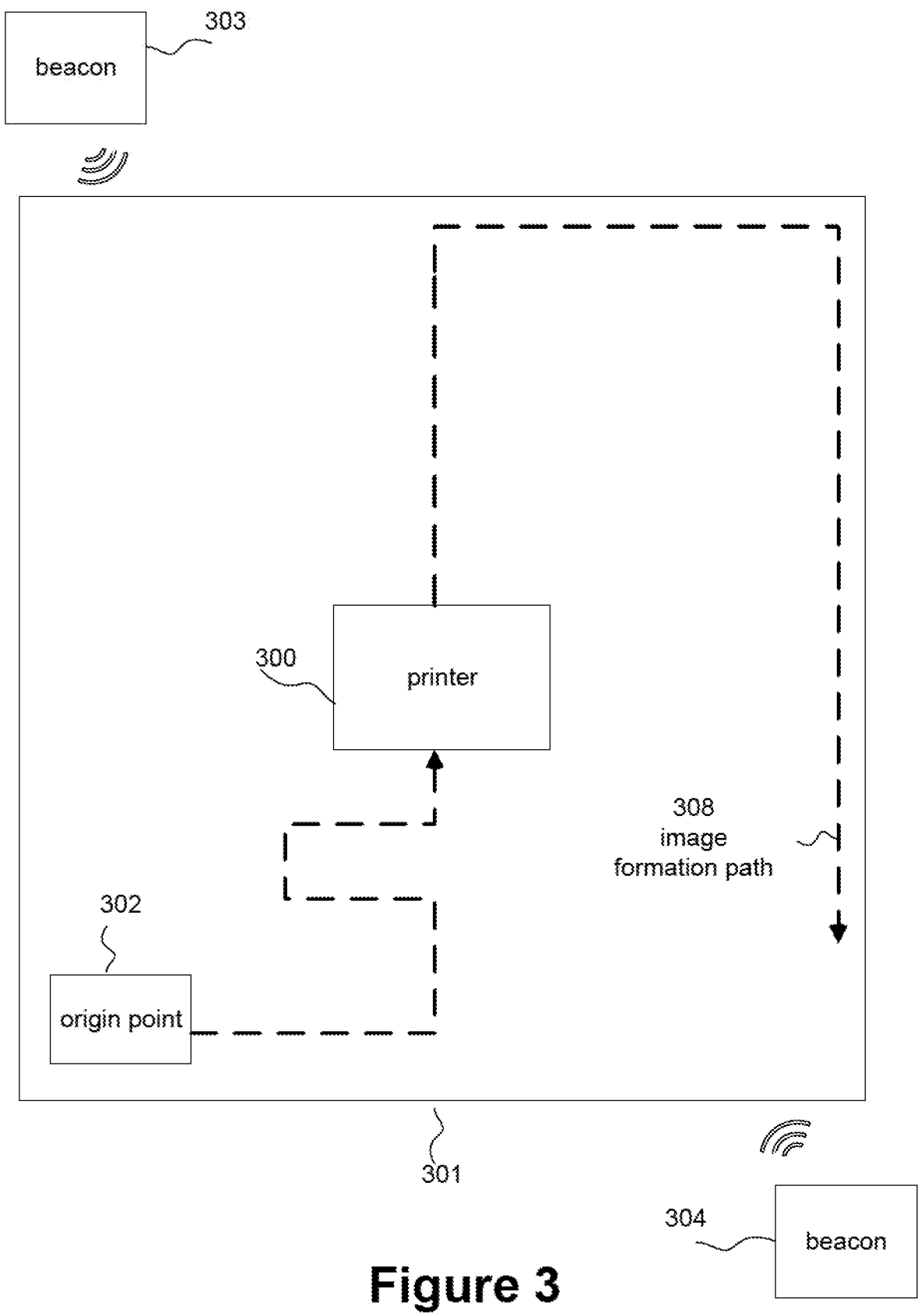
FIG. 3 schematically illustrates an example self-propelled printer in a printing environment and shows an image formation path.

FIG. 3 shows an example image formation path 308 that may be determined by the processing circuitry 304 of printer 300 to drive the self-propelled printer along a path or trajectory that results in the print head 106 (see FIG. 1) printing the image described by the print data onto the print medium 301. The path or trajectory of the image formation path may be based on the vector information of the print data that may be defined relative to an origin point of the printer. The image formation path 308 may by also be defined relative to an origin point 302 of the printer 300. The origin point 301 may be determined using position location techniques such as GPS or by techniques that provide reliable and accurate location determination for indoor environments, such as, triangulation or interpolation from transmitters, e.g. access points, of known position.

In one example, during implementation, the communication circuitry of the self-propelled printer receives the absolute origin point of the printer 300. In the example shown in FIG. 3, at least one beacon 303, 304 may be located within communication range of the self-propelled printer 300. The beacon 303, 304 may communicate over any frequency range of the electromagnetic spectrum suitable for indoor or outdoor environments, for example radio frequency or ultrasound. In some examples, during an initiation phase, the at least one beacon may be positioned relative to the origin point and the print medium by, for example, a user. The placement of the at least one beacon can be made without any high accuracy constraints and thus the placement can be imprecise. The printer may communicate the relative printer origin point to the beacon(s) 303, 304, which may be configured to determine its/their position relative to the absolute origin point using techniques such as radar or other time-of-flight or echo-location methods. By combining the received absolute printer origin position with the determined relative position of the at least one beacon 303, 304, the absolute position of the at least one beacon 303, 304 may be determined. In the example shown in FIG. 3, as the printer 300 traverses the image formation path 308, the at least one beacon 303, 304 may determine a relative position estimate of the printer 300 using e.g. radar or echo-location techniques based on the position of the at least one beacon 303, 304 and a determined relative position of the printer 300 with respect to the at least one beacon 303, 304. The at least one beacon 303, 304 may communicate the estimated displacement of the printer 300 to the printer 300. The estimated displacement of the printer may be combined with the absolute origin point to provide an absolute position estimate of the printer 300. In one example the estimated displacement of the printer 300 may be communicated to the printer 300 as printer position data. The processing circuitry 304 of the printer 300 may combine the received printer position data with the received absolute origin point. In another example, the absolute position estimate of the printer 300 may be communicated directly to the printer 300 as printer position data. To determine a range between, or an estimated displacement between, the printer 300 and two or more beacons 303, 304, a Wi-Fi or Bluetooth signal can be transmitted from a beacon 303, 304 to the printer 300 and a strength measurement at the printer can provide a range estimate. However, it can be difficult to distinguish between diminished signal strength due to distance and diminished signal strength due to signal deflections/reflections due to obstructions in a signal path. Wi-Fi signals and Bluetooth signals can be used for indoor-location of the printer 300 by measuring signal strength. Algorithms to calculate time of flight or time of arrival of Wi-Fi signals can be used to improve an accuracy of the distance/range measurement relative to the received signal strength method, it can be difficult to measure precisely the time at which a Wi-Fi or Bluetooth radio signal arrives at the printer 300 due to the sinusoidal signature of the radio wave and due to signal distortions from noise and/or multipath interference. To alleviate these potential difficulties, the beacons may use other wireless technologies, for example, ultrasound or Ultra-Wideband (UWB) communication, although other frequencies could be used.

Figure 4:
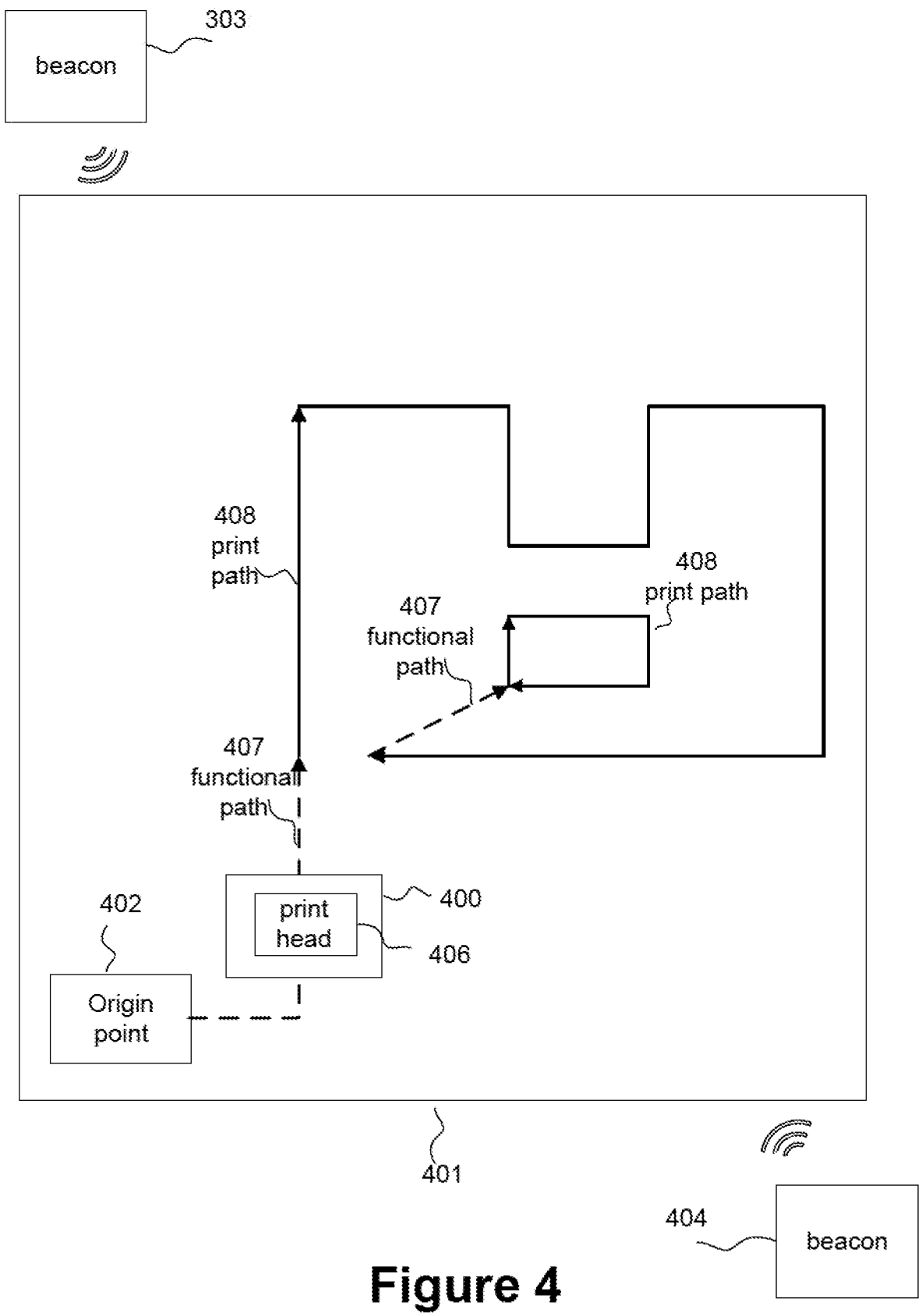
FIG. 4 schematically illustrates an example self-propelled printer in a printing environment and shows a print path and a functional path of the self-propelled printer.

FIG. 4 schematically illustrates an example in which the image formation path 108 to be traversed by the self-propelled printer 100 to cause the image described by the print data to be formed, may comprise a print path 408 and a functional path 407. The print path 408 and the functional path 407 may be based on the print data of the image to be formed. A print path 408 may be at least a portion of the image formation path during which the print material is actively transferred to the print surface 401 by the print head 406 resulting in the image being printed on the surface. The print path 408 may be the line segments of the image formation path which directly correspond to, or directly map on to, the image or building layout to be formed and may exclude any portion of the image formation path 108 that is indented to move the printer 400 to a next printing location following a temporary cessation of firing of print material from the print head 406 and prior to re-commencement of firing. For example, the print path 408 may not comprise any line segments which do not form part of the image to be printed.

A functional path 407, by way of contrast, may be a portion of the image formation path which corresponds to a path or trajectory of the self-propelled printer during which print material is not to be transferred to the print medium in order to form the image or building layout but during which the self-propelled printer performs locomotion to arrive at a next location on the the print path. For example, the self-propelled printer may start at the printer origin point 402 and may follow a functional path 407 without the print head 406 being fired to arrive at the print path 408, assuming that in this example the image to be formed is adjacent and not connected to the origin point 402. For example, the functional path 407 does not directly form the image to be printed but is the trajectory along which the printer may manoeuvre in order to allow the printer to reach a position on the print medium 401 where at least part of the image to be formed is to be printed.

Figure 5:
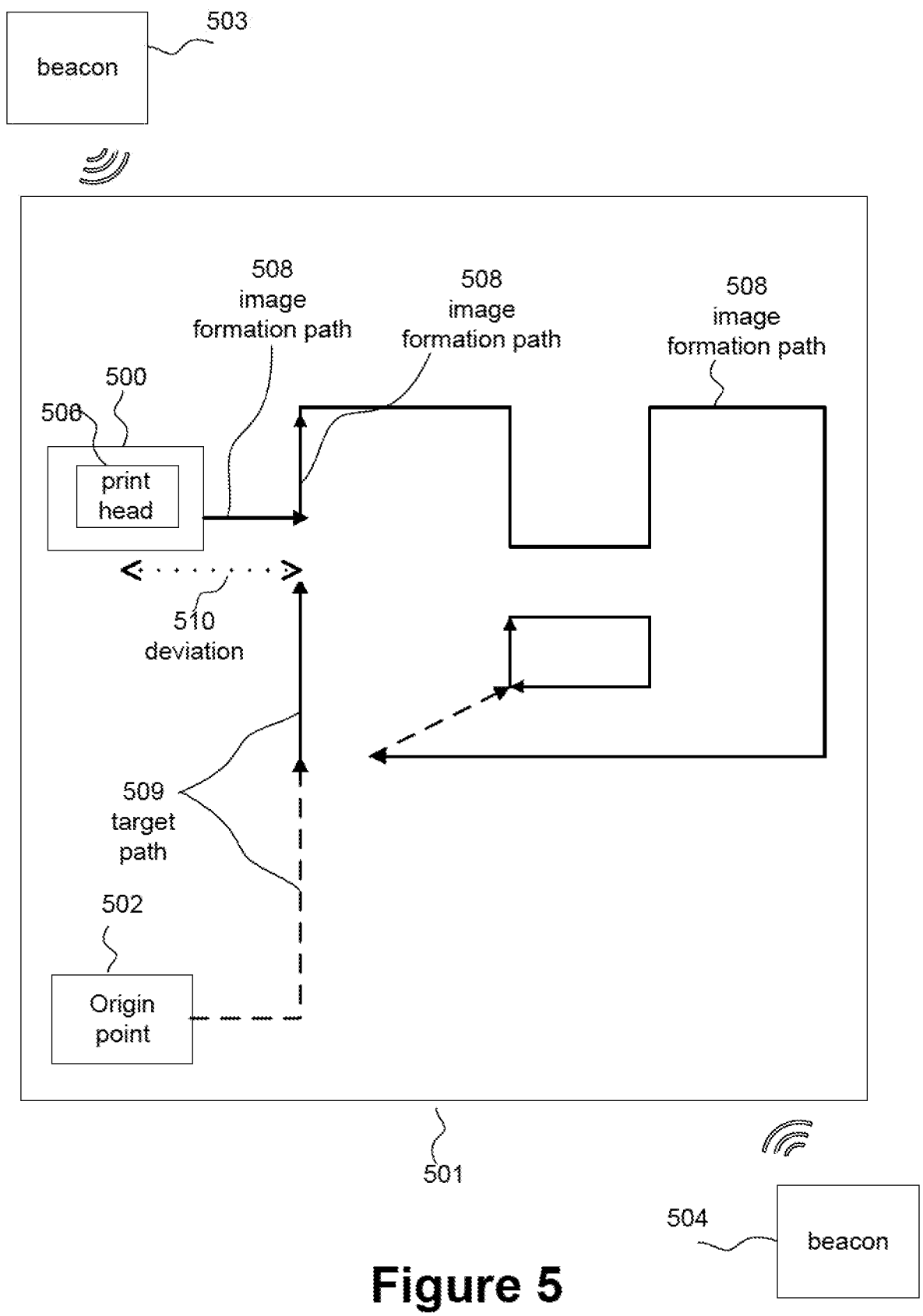
FIG. 5 schematically illustrates an example self-propelled printer in a printing environment and shows a deviation of the self-propelled printer with respect to a target path of the self-propelled printer.

In an example shown in FIG. 5, the image formation path 508 comprises a target path 509 and an undesirable deviation 510 from the target path 509. For illustration purposes, the deviation 510 has been exaggerated. The target path 509 may comprise the functional path 407 and the print path 408. The target path 509 may be based on the print data of the image to be formed. The target path 509 may be the path or trajectory which the self-propelled printer is controlled or instructed to traverse in order to form the image to be printed. The target path may be an ideal path or trajectory. For example, during locomotion of the self-propelled printer 500, the printer may experience unintended environmental effects such as an uneven terrain or, for example, the drive mechanism of the printer may drift out of configuration. This may result in the trajectory actually traversed by the self-propelled printer not following the target path 510. For example, the printer 500 may drive over a bump in the print medium. In addition to the locomotion of the printer 500 being controlled by the drive mechanism (not shown), the printer 500 may also experience a change in trajectory caused by the motion of the wheels over the unexpected bump. In this example, the printer 500 may have followed a part of the target path 509 but may at one or more point of its trajectory have additionally changed at least one of position or orientation relative to the target path.

In the example shown in FIG. 5, during implementation, the self-propelled printer 500 may deviate from the target path 510 by a measurable deviation 510. The image formation path 508 of the self-propelled printer 500 may be based on the target path 509 and a detected deviation 510 and thus the image formation path may be viewed as the actual printer trajectory rather than the target trajectory prescribed by the processing circuitry 104 based on the print data.

Figure 6A:
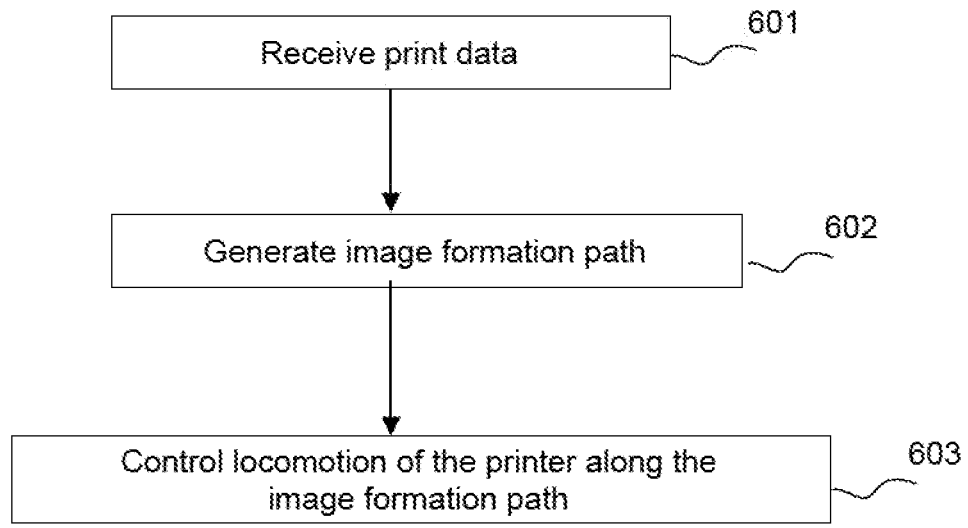
FIG. 6A is a flowchart schematically illustrating an example method of controlling the locomotion of the self-propelled printer.
Figure 6B:
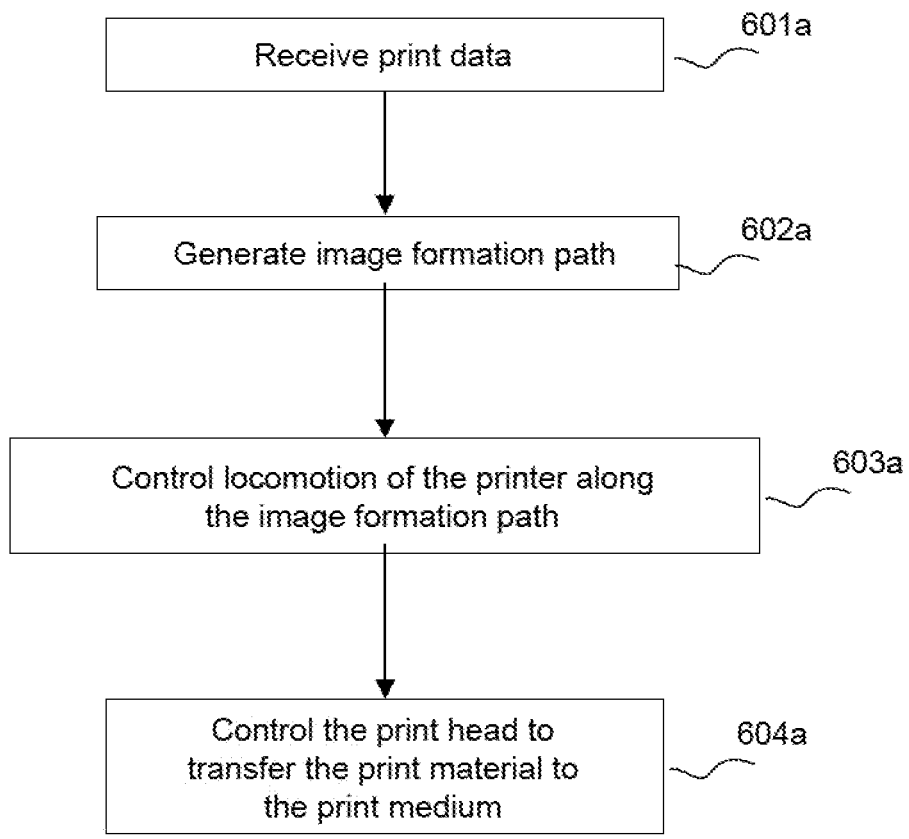
FIG. 6B is a flowchart schematically illustrating f an example method of controlling a print head of the self-propelled printer.

An example method of forming an image on a print medium by a self-propelled printer is schematically illustrated in the flow chart of FIG. 6. At block 601 the communication circuitry of the printer may receive the print data describing the image to be formed. The communication circuitry may provide the print data to the processing circuitry, for example via a bus. At block 602 the processing circuitry may generate the image formation path for the print head to traverse via locomotion of the entire self-propelled printer based at least in part on the received print data. At block 603 the processing circuitry may control the drive mechanism of the self-propelled printer to autonomously drive the self-propelled printer along the image formation path.

In some examples the processing circuitry may control the drive mechanism by generating instructions to control the drive mechanism based at least in part on the print data. The processing circuitry may generate instructions to be provided to the drive mechanism, which when executed by the drive mechanism cause the drive mechanism to control the locomotion of the self-propelled printer by driving the self-propelled printer along the image formation path. The image formation path may comprise at least the target path, which may comprise at least a print path during which the print head is activated to deposit print material and may further comprise a functional path during which the print head is inactive and yet the printer is guided to follow the path to reach a destination location corresponding to, for example, a subsequent section of the print path. In some examples, the print path and the functional path are traversed by the print head via locomotion of the entire self-propelled printer rather than via independent locomotion of the print head relative to the main body 101 of the printer.

In an example shown by the block diagram of FIG. 6A, the processing circuitry of the printer at block 604a may further, optionally, control the print head of the printer to transfer the print material to the print medium. The processing circuitry may control the print head responsive to a determination that the printer, and thus the print head, is traversing the print path component of the image formation path rather than the functional path component. For example, if the processing circuitry determines that the print head is traversing the print path of the image formation path, the processing circuitry may control at least one nozzle of the print head to fire. The firing of the at least one nozzle may transfer the print material to the print medium. If the processing circuitry determines that the print head is not traversing the print path, the processing circuitry may control the at least one nozzle not to fire.

In some examples, the print head may comprise a matrix of a plurality of nozzles. If the processing circuitry determines that the print head is not traversing the print path, the processing circuitry may control at least one of the plurality of nozzles to fire. The processing circuitry may determine which of the plurality of nozzles to fire in dependence on the position of the nozzle within the matrix and/or the orientation of the nozzle with respect to the print path of the image formation path. The processing circuitry may determine which of the at least one nozzle to fire further based on at least one of the position or orientation of the printer with respect to the target path. For example, if the self-propelled printer has deviated from the target path due to, for example a bump or depression in the print medium, the processing circuitry may select at least one nozzle to fire that will transfer the print material to the print medium in a direction oriented towards the intended print path to compensate for the unintended deviation. The processing circuitry may select at least one nozzle not to fire that will transfer the print material to the print medium in a direction oriented away from the print path.

In some examples, the print head of the self-propelled printer may comprise at least one nozzle that is moveable with respect to the print head. The processing circuitry of the self-propelled printer may control the directionality of the nozzle by moving the nozzle within the print head to direct the print material towards the print path. In some examples, the print head of the self-propelled printer may comprise at least one nozzle that is fixed with respect to the print head. The processing circuitry of the self-propelled printer may control the directionality of the print head by moving the print head within the main body of the printer. The processing circuitry may move the print head relative to the printer to direct the print material towards the print path.

Figure 7:
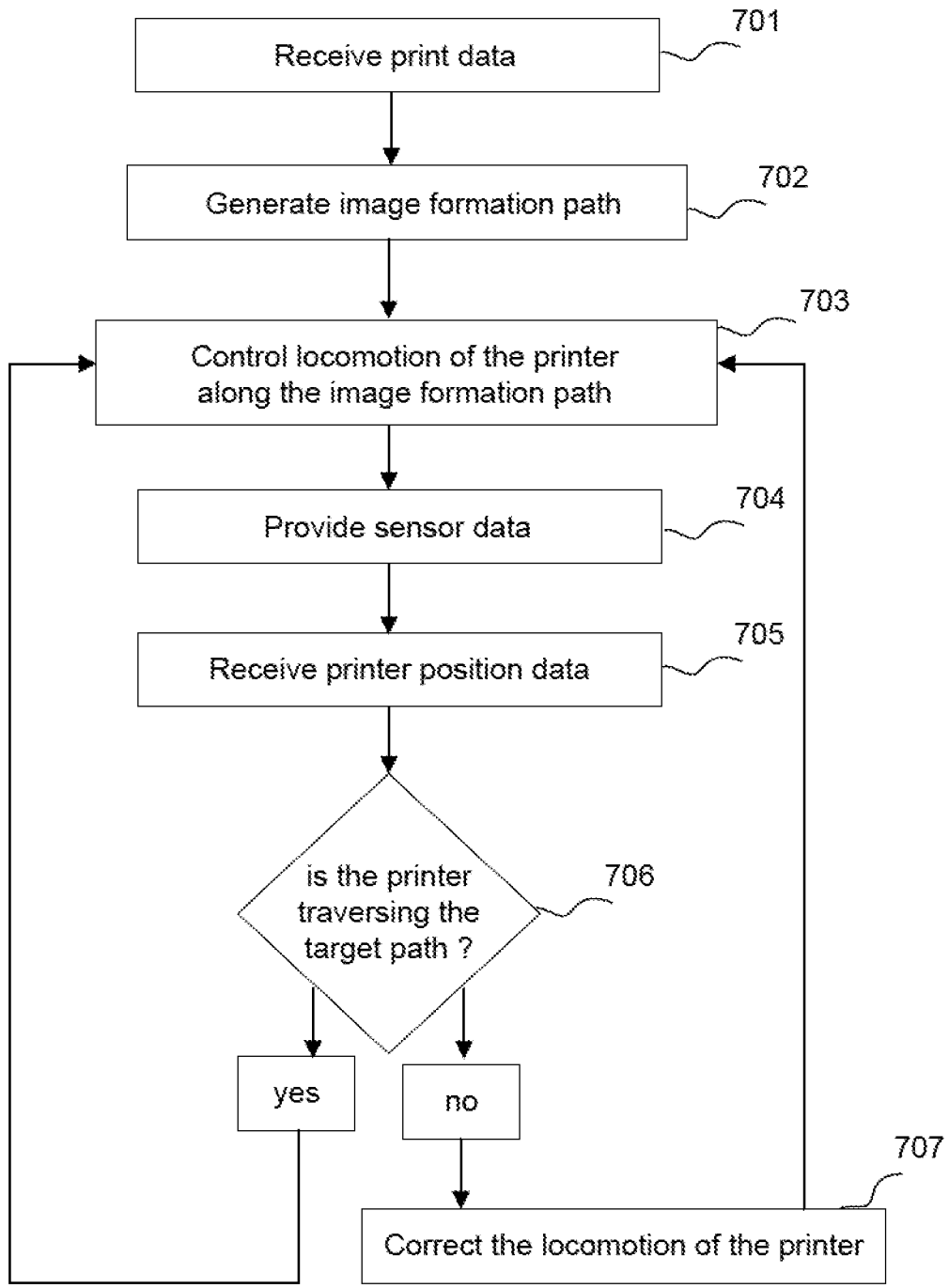
FIG. 7 is a flowchart schematically illustrating an example method of correcting the locomotion of the printer.

In some examples, the processing circuitry may control the drive mechanism of the self-propelled printer based on the image formation path comprising the target path, wherein the target path comprises at least a print path and, optionally, a functional path. However, during locomotion the printer may experience a deviation from the target path. In an example shown in the block diagram of FIG. 7 the processing circuitry may perform a correction to the locomotion of the printer in response to a determination that the printer has deviated from the target path. In some examples, the self-propelled printer may comprise at least one sensor to provide sensor data to the processing circuitry. The detection of a deviation of the printer from the target path may be based on the sensor data. In these examples, the processing circuitry may control the drive mechanism of the printer based at least in part on the sensor data. The processing circuitry may control the locomotion of the self-propelled printer based on both the print data and the received sensor data.

At block 701 the communication circuitry may receive print data for the image to be formed, for example from a server or a user device. At block 702 the processing circuitry may generate the image formation path based on the received print data. In some examples, the processing circuitry may generate the image formation path by mapping the print data to a print path and determining a functional path for the printer to traverse to allow the printer to arrive at at least one position on the print path. At block 703 the processing circuitry may control the locomotion of the printer along the image formation path. In some examples, the processing circuitry controls the locomotion of the printer by generating instructions to be executed by the drive mechanism. At block 704 at least one sensor of the self-propelled printer may capture data and may provide the sensor data to the processing circuitry. In some examples the sensor data may be to detect the locomotion of the self-propelled printer. The sensor data may be provided by at least one of a wheel encoder, an optical sensor, LIDAR, an IMU or other position tracking or locomotion detecting sensors.

At block 705 the processing circuitry may receive printer position data. In some examples the printer position data may be received by the communication circuitry of the self-propelled printer from at least one beacon within communication range of the self-propelled printer. Although shown as a sequence, it is to be understood that the blocks 704 and 705 of FIG. 7 may be performed at any stage prior to block 706, and may be performed simultaneously, in reverse order to that shown, or at the same time as block 701.

At block 706 the processing circuitry may determine if the printer is traversing the target path. In some examples the processing circuitry may determine if the printer is traversing the target path based on whether a deviation from the target path is detected. At block 707 in response to determining that the self-propelled printer is not traversing the target path, the processing circuitry may perform a correction to the locomotion of the printer. In some examples the processing circuitry may perform a correction to the locomotion of the printer in depending on the detected deviation of the printer from the target path. In some examples, the processing circuitry may perform the correction to the locomotion of the self-propelled printer by generating, or updating, the image formation path based on the received print data and the detected deviation. In some examples, at block 703 the processing circuitry may control the locomotion of the self-propelled printer by generating instructions to be executed by the drive mechanism based on the generated, or updated, image formation path.

Figure 8:
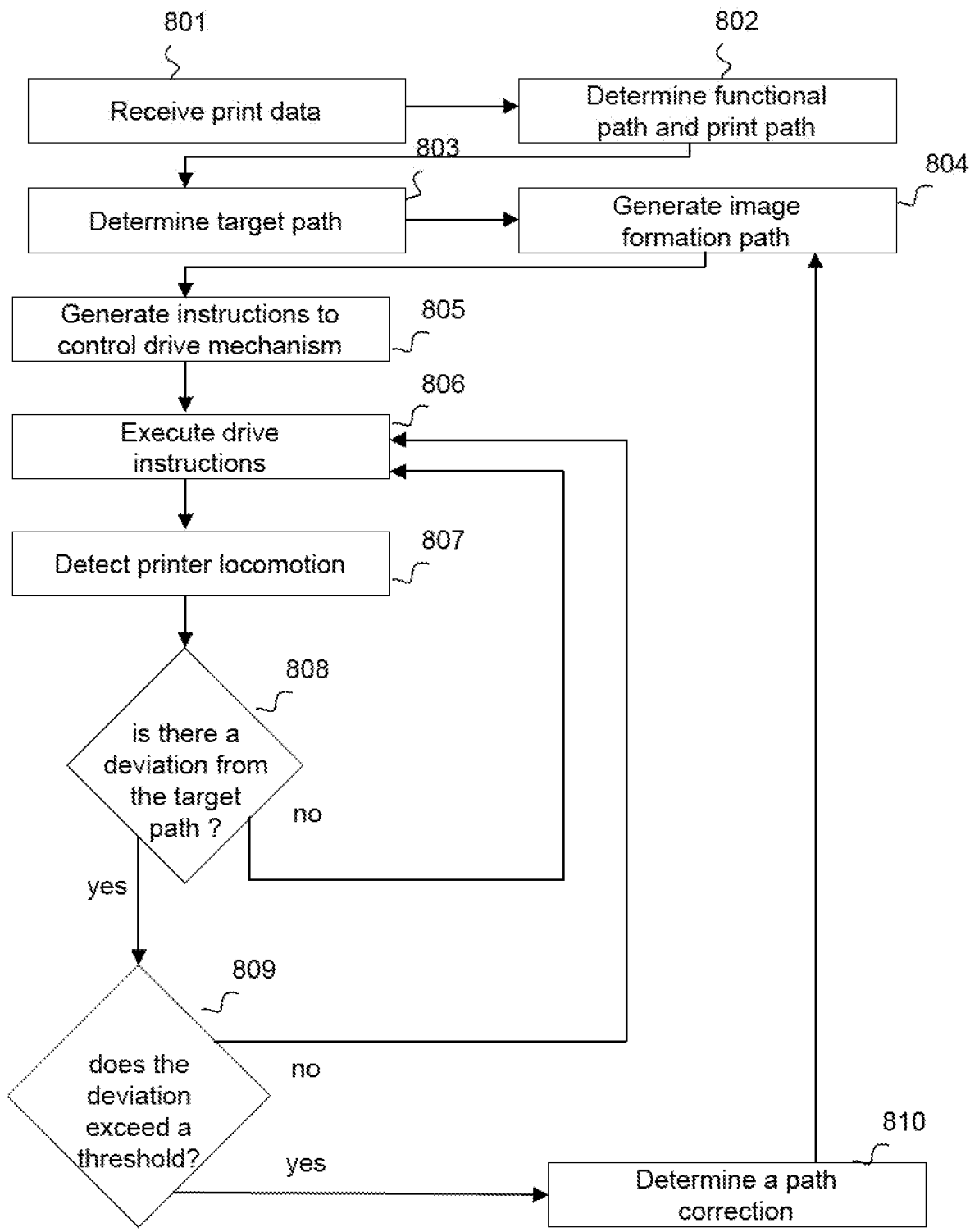
FIG. 8 is a flowchart of an example method of performing a path correction for the self-propelled printer.

In an example method schematically illustrated in the block diagram of FIG. 8, at block 801 the processing circuitry of the self-propelled printer may receive the print data for the image to be printed. At block 802 the processing circuitry of the self-propelled printer may determine a functional path and print path based on the print data. At block 803 the processing circuitry may determine the target path for the print head to traverse via locomotion of the self-propelled printer based on the determined functional path and the determined print path. At block 804 the processing circuitry may generate the image formation path to be traversed by the self-propelled printer based on the target path. At block 805 the processing circuitry may generate instructions to control the drive mechanism of the self-propelled printer and may provide the generated instructions to the drive mechanism. At block 806 the drive mechanism may execute the instructions to control the locomotion of the self-propelled printer. At block 807 at least one sensor of the self-propelled printer may detect the locomotion of the printer.

At block 808 the processing circuitry of the self-propelled printer may determine if there is a deviation of the printer from the target path. In some examples this determination may be based on the detected printer locomotion. In some examples, at block 809 responsive to determining that the printer has deviated from the target path, the processing circuitry may determine if the detected deviation exceeds a pre-determined threshold. At block 810 responsive to determining that the deviation of the printer from the target path exceeds a pre-determined threshold, the processing circuitry may determine a path correction. For example, the path correction may be based on the determined deviation and the correction may negate, or at least mitigate, the deviation of the printer from the target path. For example, the path correction may be the inverse of the deviation. For example, the path correction may be a vector equal in magnitude but opposite in direction to the deviation of the printer from the target path. In some examples, the path correction may be calculated to provide the shortest path for the printer to traverse in order to arrive back to at least one point on the target path, where the point that the printer may arrive back at the target path may not be the point at which the printer deviated from the target path. In some examples, the processing circuitry of the self-propelled printer may determine the path correction by weighting the relative importance to the image to be formed of the shortest path back to the target path against a trajectory that will cause the printer to arrive back at the target path at the point along the target path where the printer started to deviate from the target path. In some examples the processing circuitry may control the transfer of the print material to the print medium via the print head depending on the path correction.

Figure 9:
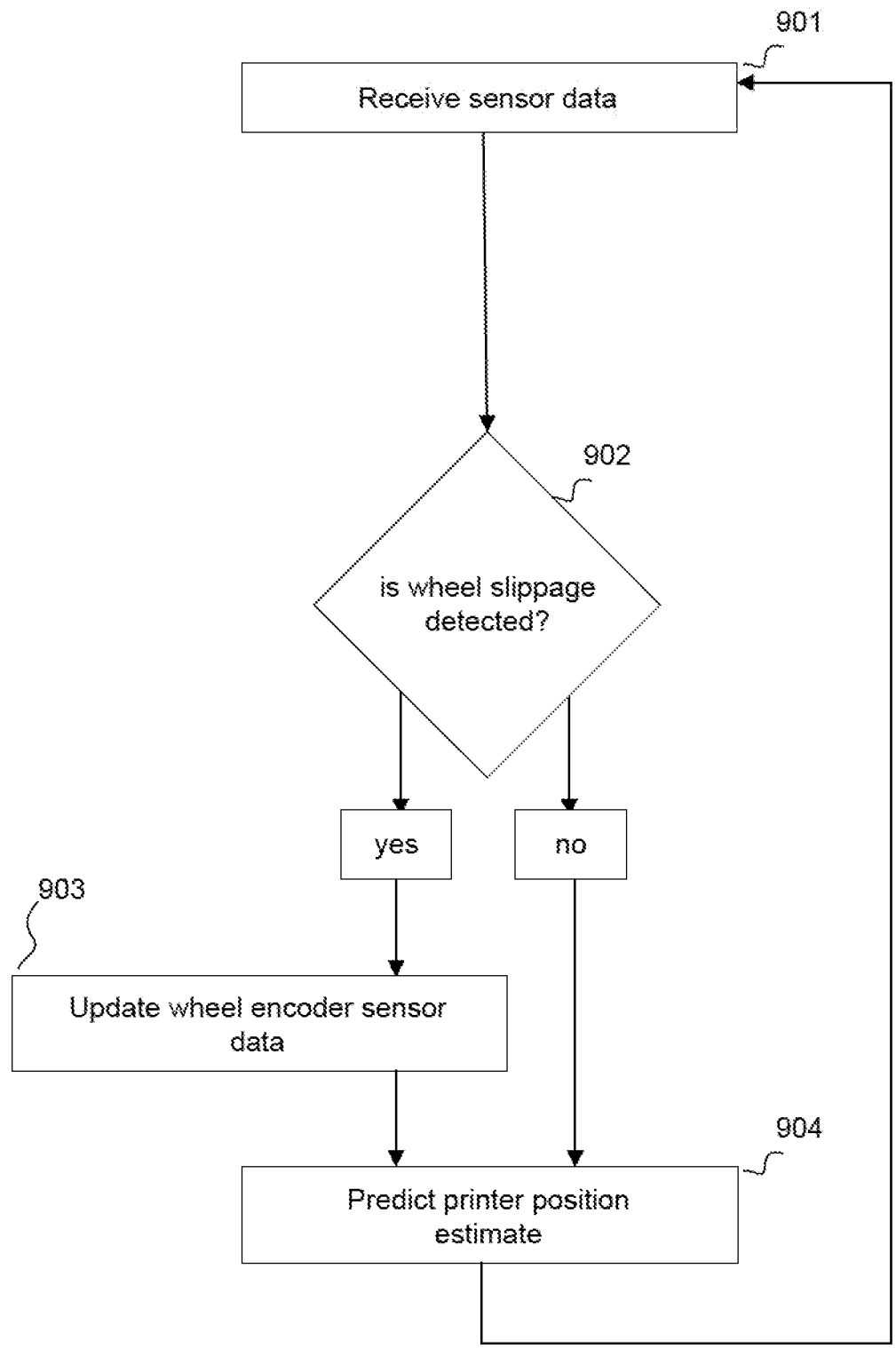
FIG. 9 is a flowchart schematically illustrating an example method of predicting a printer position estimate.

FIG. 9 shows an example method for detecting the locomotion of the printer. At block 901 the processing circuitry of the self-propelled printer may receive sensor data from at least one sensor of the self-propelled printer. In one example the at least one sensor may be a sensor to detect a variable indicative of the locomotion of the printer, such as, a wheel encoder configured to detect the revolution of at least one of the wheels of the drive mechanism of the self-propelled printer.

At block 902 the processing circuitry may determine if the printer has experienced wheel slippage. In some examples this determination may be based on sensor data. At least one sensor of the self-propelled printer may be configured to detect the slippage of the self-propelled printer relative to the print medium. For example, the determination may be based on data from an optical sensor. Responsive to a determination that the printer has experienced wheel slippage, at block 904, the processing circuitry may update the wheel encoder data to reduce the certainty associated with the wheel encoder sensor data.

At block 905 the processing circuitry may predict a printer position estimate based on the detected locomotion of the printer from at least one sensor. At block 904 the processing circuitry may estimate at least one of a relative distance traversed by the printer or a change in orientation of the printer based on sensed data indicative of the locomotion of the printer and the physical laws governing the locomotion of the self-propelled printer. For example, the processing circuitry may estimate the relative distance traversed by a printer from a starting point using the number of wheel revolutions detected by the wheel encoder, and the known dimensions of the wheel. In another example, the processing circuitry may estimate a relative distance travelled by the printer since a starting time based on an acceleration detected by a sensor, such as an IMU, and the time lapsed between the determination and the starting time. At block 904 the processing circuitry may further predict a printer position estimate based on at least one of a previous estimate, or a last known position or orientation of the printer and the estimated relative distance traversed or change in orientation of the printer, caused by the locomotion of the printer.

In some examples, during implementation, the inaccuracy of the printer position estimate may increase with time due to drift arising from multiple iterations of position estimation based on relative movements of the printer determined from at least one of the sensors of the self-propelled printer.

Figure 10:
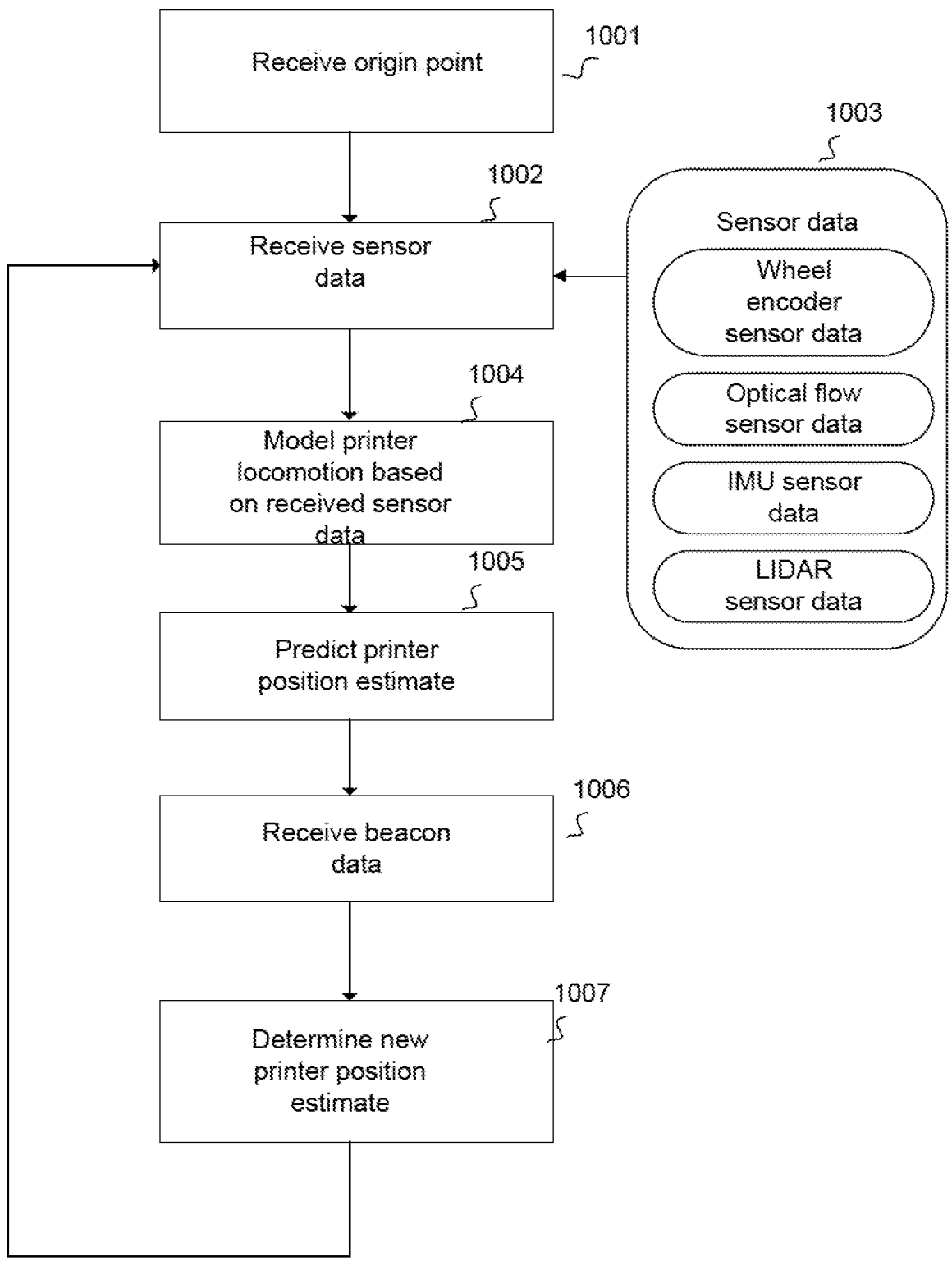
FIG. 10 is a flowchart schematically illustrating an example method of determining a new printer position estimate.

In the example flow chart schematically illustrated in FIG. 10, the processing circuitry may detect a deviation of the printer from a target path based on a combination of the detected locomotion of the printer and printer position data received from at least one beacon within communication range of the printer. In one example the deviation of the printer from the target path is determined based on a new printer position estimate determined from a combination of the sensor data and the received printer position data. In the example shown in FIG. 10 at block 1001 the processing circuitry may receive an origin point relative to which the position of the printer and the image formation path are defined. At block 1002 the processing circuitry of the printer receives sensor data 1003. In some examples the sensor data may comprise data from a plurality of sensors configured to detect locomotion of the printer. For example, the sensor data may comprise one or more of wheel encoder sensor data, optical flow sensor data, IMU sensor data or LIDAR sensor data or any other data from sensors configured to detect the locomotion of the printer.

At block 1004 the processing circuitry of the self-propelled printer may model the locomotion of the printer based on sensor data received from at least one sensor. The printer locomotion may be modelled based on a combination of sensor data from at least a plurality of the self-propelled printer sensors. For example, based on at least the data sensed by one or more sensors, the processing circuitry may model at least one of a change in position or change in orientation of the printer. In some examples, the modelling is further performed based on the physical laws that govern the locomotion of the printer. At block 1005 the processing circuitry may predict at least one printer position estimate based on the modelled change in at least one of position or orientation of the printer and a previous printer position estimate or last known location of the printer. The processing circuitry of the printer may predict a printer position estimate from each of the sensors of the printer.

In some examples, the processing circuitry may combine the predicted printer estimates from each of the sensors. This combination may be performed based on a weighting of each estimate, where the weighting of each estimate may depend on the relative accuracy of the sensor data. In some examples the printer may predict a printer position estimate from a combination of the sensor data from each of the sensors of the printer. This combination may be performed based on a weighting of each of the sensor data, where the weighting of each of the sensor data may depend on the relative accuracy of the sensor data.

At block 1006, the processing circuitry may further receive absolute printer position data from at least one beacon in communication with the printer. In some examples the processing circuitry may combine a plurality of printer position data received from a plurality of beacons. At block 1007 the processing circuitry may determine a new printer position estimate by combining the predicted printer position estimate from block 1005, determined based on at least the detected locomotion of the printer, and the printer position data received from the at least one beacon. According to the example shown in FIG. 10, this determination combines at least one relative position estimate derived from sensor data with at least one absolute printer position received from the at least one beacon.

In some examples, the combination comprises a weighted average and the weighting of (each of) the predicted printer position estimate(s) and the absolute printer position(s) received from the beacon reflects their relative accuracies. For example, the combination of the sensor data and the printer position data received from the beacon may be performed based on any well-known variable estimation or interpolation algorithm. In some examples, the combination may be performed using algorithms applied in the art to minimise the errors in estimates of unknown variables derived from sensor data, such as Kalman Filtering. Although shown as a sequence, it is to be understood that the block 1001, blocks 1002-1005 in the sequence as shown and block 1006 of FIG. 10 may be performed at any stage prior to block 1007, and may be performed simultaneously.

Figure 11:
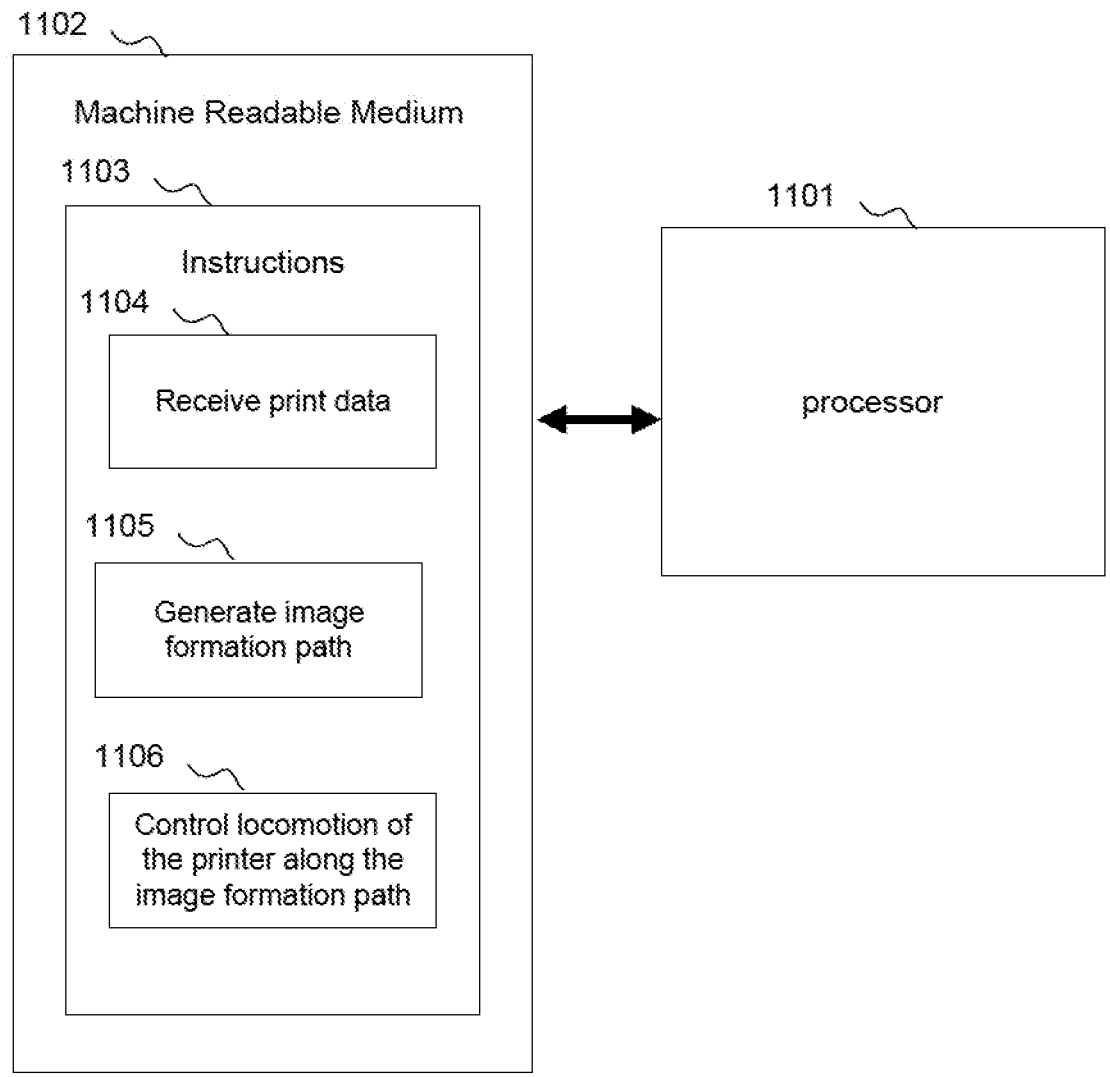
FIG. 11 is a schematic representation of an example machine readable medium and a processor for performing example methods described herein.

FIG. 11 shows a schematic representation of a tangible or non-tangible machine readable medium 1102 comprising instructions 1103 which, when executed, cause a processor 1101 to perform example processes described herein. In an example, the machine readable medium 1102 comprises a set of instructions which when executed cause the processor 1101 to perform a method as described with reference to FIGS. 6-10. In an example, the machine readable medium 1102 comprises a set of instructions 1103 which, when executed by a processor 1101 cause the processor 1101 to control a self-propelled printer to generate an image formation path to be traversed by the self-propelled printer and to control the locomotion of the self-propelled printer along the image formation path, wherein the self-propelled printer comprises a print head to transfer a print material to a print medium.

In some examples, the machine readable medium may comprise instructions to receive print data for the 2D image to be formed, generate an image formation path to be traversed by a print head via locomotion of the self-propelled printer, the image formation path based at least in part on the received print data, wherein the print head is to transfer a print material on to a print medium, and control a locomotion of the self-propelled printer along the image formation path based on the image formation path.

In some examples, the machine-readable medium may comprise instructions to control the print head to transfer the print material to the print medium in dependence on a determination that the printer is traversing a print path of the image formation path, wherein the image formation path comprises a print path and a functional path.

In some examples, the machine-readable medium may comprise instructions to control the print head to transfer the print material to the print medium by selecting at least one nozzle from a plurality of nozzles of the print head to transfer the print material to the print medium.

In some examples, the machine-readable medium may comprise instructions to control the drive mechanism of the printer based at least in part on sensor data provided by at least one sensor of the printer, wherein the at least one sensor is to detect locomotion of the printer.

In some examples, the machine-readable medium may comprise instructions to detect a slippage of the self-propelled printer relative to the print medium.

In some examples, the machine-readable medium may comprise instructions to detect a deviation of the self-propelled printer from a target path, wherein the target path of the self-propelled printer is based on the received print data and the detected deviation from the target path is based on at least a combination of the detected locomotion of the self-propelled printer and the received printer position data.

In some examples, the machine-readable medium may comprise instructions to combine the detected locomotion of the self-propelled printer and the received printer position data by performing a weighted average of a predicted position estimate of the self-propelled printer determined based on at least the detected locomotion of the printer and the received printer position data.

In some examples, the machine-readable medium may comprise instructions to perform a correction to the locomotion of the self-propelled printer in dependence on the detected deviation of the self-propelled printer from the target path, wherein performing the correction comprises generating the image formation path based on the received print data and the detected deviation of the self-propelled printer from the target path.

In some examples, the machine-readable medium 1102 may form part of the self-propelled printer.

It shall be understood that some blocks in the flow charts can be realized using machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode. Further, some teachings herein may be implemented in the form of a computer software product, the computer software product being stored in a storage medium and comprising a plurality of instructions for making a computer device implement the methods recited in the examples of the present disclosure.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A self-propelled printer, comprising:
communication circuitry to receive print data for an image to be formed;
a drive mechanism to provide locomotion of the self-propelled printer;
a print head to transfer a print material on to a print medium;
a main body comprising a plurality of sensors to provide data to processing circuitry, wherein the plurality of sensors comprise a first sensor to detect at least one of relative distance and orientation of the self-propelled printer, a second sensor to track locomotion of the self-propelled printer over a period of time, a third sensor to detect slippage of at least one wheel of the drive mechanism relative to the print medium, and a fourth sensor to detect rotation of the at least one wheel of the drive mechanism; and
the processing circuitry to generate an image formation path to be traversed by the print head via locomotion of the self-propelled printer, the image formation path based at least in part on the received print data, and to control the drive mechanism to autonomously drive the self propelled printer along the image formation path.

2. The self-propelled printer of claim 1, wherein the image formation path is defined relative to an origin position.

3. The self-propelled printer of claim 1, wherein the image formation path comprises a print path and a functional path to be traversed by the print head via locomotion of the self-propelled printer, wherein the processing circuitry is to control the print head to transfer the print material to the print medium in depending on a determination that the printer is traversing the print path of the image formation path.

4. The self-propelled printer of claim 3, wherein the print head comprises a plurality of nozzles and wherein the processing circuitry is to further control the print head to transfer the print material to the print medium by selecting at least one nozzle from the plurality of nozzles to transfer the print material to the print medium.

5. The self-propelled printer of claim 1, wherein the first sensor comprises a light detection and ranging sensor.

6. The self-propelled printer of claim 1, wherein the second sensor comprises at least one of an inertial measurement unit sensor comprising an accelerometer to detect a linear acceleration of the self-propelled printer, a gyroscope to detect a rotational acceleration of the self-propelled printer, or a magnetometer to provide an orientation of the self-propelled printer relative to magnetic north.

7. The self-propelled printer of claim 6, wherein the communication circuitry is configured to receive printer position data from at least one beacon within communication range of the self-propelled printer.

8. The self-propelled printer of claim 7, wherein the processing circuitry is to detect a deviation of the self-propelled printer from a target path, wherein the target path of the self-propelled printer is based on the received print data and the detected deviation from the target path is based on at least a combination of detected locomotion of the self-propelled printer and the received printer position data.

9. The self-propelled printer of claim 8, wherein the combination of the detected locomotion of the self-propelled printer and the received printer position data comprises a weighted average of a predicted position estimate of the self-propelled printer determined based on at least the detected locomotion of the printer and the received printer position data.

10. The self-propelled printer of claim 8, wherein the processing circuitry is to perform a correction to the locomotion of the self-propelled printer in dependence on the detected deviation of the self-propelled printer from the target path.

11. The self-propelled printer of claim 10, wherein performing the correction to the locomotion of the self-propelled comprises generating the image formation path based on the received print data and the detected deviation of the self-propelled printer from the target path.

12. The self-propelled printer of claim 1, wherein the third sensor comprises at least one optical sensor.

13. The self-propelled printer of claim 12, wherein the at least one optical sensor comprises at least two optical detectors to detect a relative motion between the printer and the print medium.

* * * * *